Feb. 8, 1944. B. G. HEEBINK 2,341,097
FILTER
Original Filed May 13, 1940 2 Sheets-Sheet 1

Inventor
Bruce G. Heebink
By: Tesch and Darbo
Attys.

Feb. 8, 1944.   B. G. HEEBINK   2,341,097
FILTER
Original Filed May 13, 1940   2 Sheets-Sheet 2

Inventor:
Bruce G. Heebink
By: Tesch and Darbo
Attys.

Patented Feb. 8, 1944

2,341,097

UNITED STATES PATENT OFFICE 2,341,097

FILTER

Bruce G. Heebink, Middleton, Wis., assignor to Research Products Corporation, Madison, Wis., a corporation of Wisconsin Substituted for abandoned application Serial No. 334,707, May 13, 1940. This application December 14, 1942, Serial No. 468,877

5 Claims. (Cl. 183—73)

This invention relates to air filters, particularly to cylindrical filter elements of the type employed in intake air cleaners for internal combustion engines.

This application is a substitute for my application Serial No. 334,707, filed May 13, 1940.

An object of the invention is to provide a filter of the above-mentioned type having a semi-self-sustaining filtering body whereby only a single supporting member is required. A further object is to provide a filtering element having high efficiency and capacity by increasing the effective area of the element. Further objects lie in the self-sealing feature of the filter and in the provision of a filtering body having predetermined filtering efficiency characteristics at different points of progress of the gases through it, this result being achieved by controlling the mesh of the successive layers comprising the filtering body.

A further object of the invention is to provide a method for the manufacture of gas filters having the above characteristics.

The filtering element of this invention consists of two parts, namely, a cylindrical rigid support 1 and a filtering body 2 formed by spirally winding a ribbon of the filtering material upon the support. Any material capable of supporting the filtering body such as reticulated or apertured sheet metal, fiberboard, or asbestos board, may be used for the support. If the filtering material is to be covered with a tacky film to aid in holding foreign materials, an absorbent material may be used for the support to serve as a reservoir for the oil or compound which then travels to remote parts of the body by wick action.

The preferred filtering material for the purposes of this invention is produced by slitting and expanding fibrous sheet material, as will be more fully explained hereinafter. The assembly of filtering body and support is preferably fastened together in a manner hereinafter more fully described.

Figure 2:
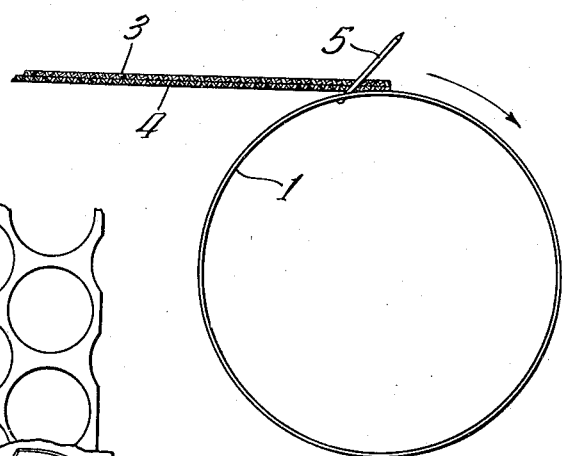
Fig. 2 illustrates a step in the manufacture of the filter element of Fig. 1.

Although the filtering body 2 may be formed from a plurality of individual cylinders of expanded material in nested relation to each other, it is preferable from the standpoint of economy in manufacture to wind a substantially continuous ribbon of the expanded material onto the support. A single ribbon may be used, but in practice a plurality of ribbons, for example, a pair of ribbons 3 and 4, of the expanded sheet material having oppositely oriented webs are used simultaneously. The purpose in using a number of ribbons in this way is to build up a filtering body having opposite web orientation in alternating layers whereby the gases passing through the filter are required to follow a very tortuous path and also to increase production speed. The ends of the ribbons are fastened to the support 1, as indicated in Fig. 2, and the support is then rotated in the direction indicated by the arrow until the desired thickness of filtering body has been wound upon it. The ribbons are then severed and the loose ends bound to the filtering body.

Figure 1:
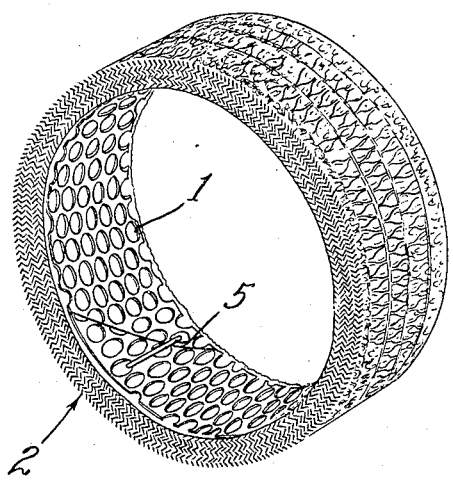
Fig. 1 is a perspective view of the preferred form of this invention.

It is desirable, in manufacturing the filtering element, to provide suitable means for quickly attaching the ends of the ribbons to the support at the beginning of the winding process and to provide means for binding the loose ends at the outside of the element to the filtering body. The preferred construction for accomplishing both of these purposes by a single means is illustrated in Figs. 1 and 2. As there shown, a staple 5 is welded or otherwise fastened to a metallic support at such an angle that as the support is rotated the points of the staple pierce the ribbons 3 and 4 and the staple passes through the expanded material without deforming or in any way interfering with the winding of the expanded filtering material onto the support and body. In other words, the staple should be at such an angle that the distance from the point of contact of the ribbon with the support to the points of the staple at the time of initial contact of the staple with the ribbon will be approximately equal to the circumferential distance from the point of contact of the ribbon with the support to the base of the staple. With this arrangement, the ends of the stock ribbons may be slipped over the staple, the filter body built up to the desired thickness, and the staple then clinched to bind the loose ends of the ribbons and to fasten the filtering body to the support. More than one staple may be used if desired.

Various filtering requirements and desired filtering efficiencies require that filtering elements of different filtering characteristics be available to the market. The present invention offers a means for readily and completely controlling the characteristics of the filtering body. One of the factors affecting both filtering efficiency and the effective length of life of a filtering element of the type herein concerned is the fineness of the interstices, that is, the mesh of the filtering body through which the gases must flow. The gases to be filtered and entrained particles pass more readily through a filter body having a comparatively open mesh than they do through a body having a finer mesh. It will be readily understood that the mesh size of the expanded sheet material forming filtering body 2 will be directly proportional to the tension maintained in the ribbons 3 and 4 of expanded material as the latter is wound upon the support 1. The ribbons are elastic and may be stretched to any desired extent. Thus, the filtering characteristics can be readily controlled, within limits, by regulating the ribbon tension during the winding process.

For certain purposes, a filter having progressively finer mesh in the direction of air flow through the filtering body is desirable. As a general proposition, such a filtering element will have a longer useful life than one of uniform mesh for the reason that its dirt-holding capacity is greater. Whereas in the case of a body of uniform mesh, especially in the ordinary fiber strand filter, a layer of foreign materials quickly accumulates on the exposed surface exposed to the air stream entering the filter to restrict the flow of air through the filter while the interior of the body remains comparatively clean. In a filter element of this invention having graduated mesh, progressively finer foreign materials are permitted to pass more deeply into the filter, loading the filtering body relatively uniformly throughout its depth. In this way, surface clogging is prevented and the resistance of the body to air flow increases relatively slowly to give a longer useful life to the filter.

Figure 3:
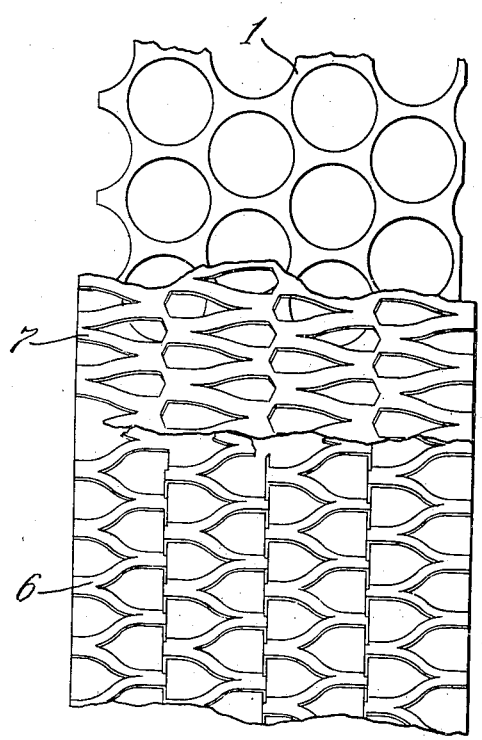
Fig. 3 is an enlarged partial section showing the outer and the inner layers of one form of filter element.

To provide a filtering element having the desirable characteristics described, it is only necessary to gradually increase the tension on the ribbons as the unit is being wound, maximum tension being reached as the outer layers of the body are being laid. Sections of a filtering element formed in this way are shown in enlarged scale in Fig. 3 of the drawings. The maximum mesh size is illustrated at 6 and the finer mesh of the partially expanded inner layers is shown at 7.

Figure 6:
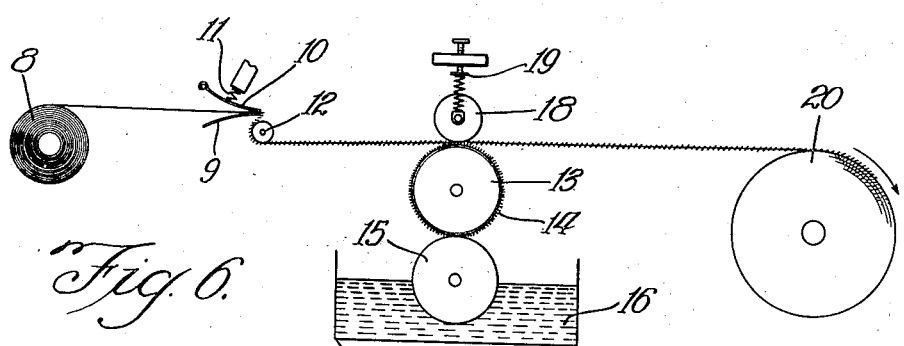
Figs. 6 and 7 are diagrammatic illustrations of the method of manufacture of the filtering element.
Figure 7:
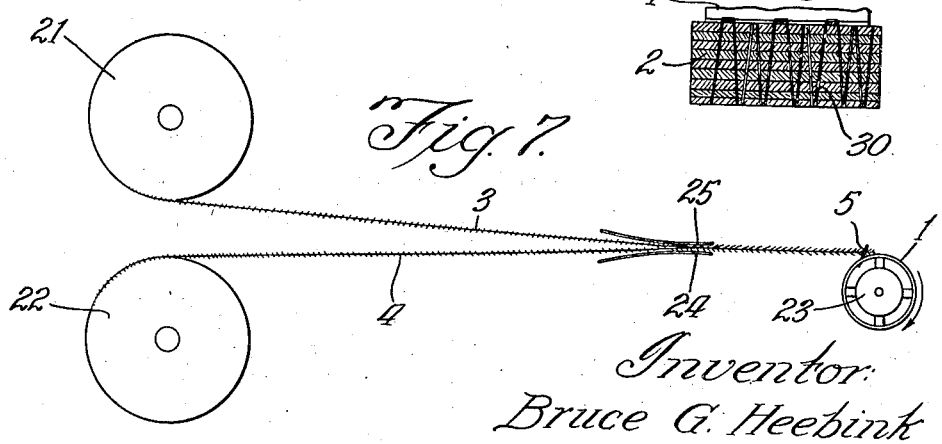

The manufacturing operations involved in the fabrication of the filter elements of this invention are illustrated diagrammatically in Figs. 6 and 7. The ribbon from the stock roll 8 of slitted material is passed over table 9 and turned abruptly over an edge thereof as a step in the uniform expansion of the material. The expansion is accomplished by reason of the tension, regulated by means of friction fingers 10 and spring 11, in the ribbon at the edge of table 9 as the ribbon passes over this edge and around idler roll 12. In the preferred process, the expanded material is then coated with a thin film of tacky adhesive, such as a non-drying oil or one of the several specially prepared compounds which are readily available for this purpose. This "oiling" process is preferably done by passing the expanded ribbon over a roll having a surface covering of a suitable pile fabric, such as mohair or carpeting, which is continuously supplied with the oiling compound by a feeder roll 15 operating in a bath 16 of the compound. A heater 17 is generally necessary to maintain the bath temperature at a point required to impart the desired fluidity to the compound. A suitable roll 18 and roll pressure regulating apparatus 19 are provided to force the expanded stock into the compound-applying pile of the fabric 14. Rolls 13 and 18 are preferably positively driven to prevent relative slippage between the expanded stock and the roll 13 with consequent uneven application of adhesive compound. The oiled stock is wound onto a roll 20 and stored until required.

In the manufacture of the filtering elements from the treated expanded material prepared as above described, a pair of stock rolls 21 and 22 are mounted as indicated in Fig. 7 to unwind in opposite directions. In this way ribbons 3 and 4 are supplied to the filter-winding mechanism with oppositely oriented webs. More than two ribbons may be used if desired. The expanded filtering material is wound on support 1 upon rotation of arbor 23 on which the support is mounted. Rotation of the arbor in the direction indicated by the arrow draws the ribbons 3 and 4 of expanded sheet material from the stock rolls 21 and 22 through a device for controlling the tension in the ribbons as the expanded material is wound upon the support. For this purpose a table 24 over which the material slides is provided and a friction shoe 25 is arranged to bear downwardly with adjustable pressure to thereby control the resistance offered by the mechanism to the passage of the ribbons through it. The shoe 25 may be spring controlled or may be designed to be regulated by means of pressure exerted manually by the operator of the assembling machine. As hereinbefore stated, winding of the expanded material upon the support is continued until the desired thickness of filtering body is obtained whereupon the ribbon is severed and the staple 5 clinched to bind the loose ends of the material and the filtering body to the support.

It will readily be appreciated by those skilled in the art that this invention provides an extremely simple but effective method of manufacturing filters of any pre-determined filtering characteristics. A fine mesh filter or a coarse mesh filter may be fabricated without changing the apparatus other than the pressure adjustment of shoe 25. By gradually increasing the pressure on friction shoe 25 as the expanded material is being wound upon support 1, a filtering element of graduated mesh, such as that illustrated in detailed section in Fig. 3 may be obtained.

A number of filter elements may, of course, be wound upon arbor 23 simultaneously. Wide ribbons may be wound upon a unitary cylindrical support of corresponding height and the assembly later cut into the desired filter element sizes. It is sometimes preferable, however, to place a plurality of supports of the desired size upon the arbor so that it is necessary to cut only the filtering body after the winding process has been completed. This latter method is followed in the manufacture of filtering elements having filtering bodies overhanging one or both edges of their supports, the supports being placed upon the arbor in spaced relation to each other in this case. Filters of this type have the advantage of being self-sealing when installed in the filter structure. By-passing of air around the filtering body is prevented by the pressure of the filter cover and base against the filtering material as these members are drawn together to meet the rigid filtering body support.

In the assembling of the filtering elements, a single ribbon of expanded material may be used rather than the pair or plurality of ribbons as described above. Also, unoiled expanded material may be used in the winding of the elements and the adhesive compound applied by spraying the assembled element.

Figure 4:
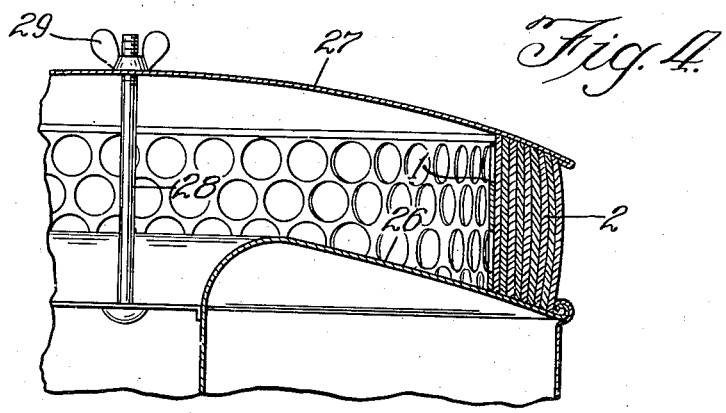
Fig. 4 is a sectional view of a portion of an air cleaner assembly including the filter element.

A portion of an air cleaner assembly including the filter element of this invention is illustrated in Fig. 4. The filtering element is seated on a portion of base 26 intended to receive it. Cover 27 is secured in place against the upper edge of support 1 of the filtering element by means of bolt 28 and wing nut 29. In drawing the cover 27 downwardly in the final step in the assembly of this air cleaner, filtering body 2 is axially compressed. This compression will take place when the filtering element is provided with a body which overhangs the support. As a result of the axial compression of the filtering body 2, the edges of the body are tightly sealed to the cover and base members of the air cleaner, as hereinbefore described, and the middle portions of the filtering body are bulged outwardly in the manner indicated in the drawings. This bulging is desirable since it results in the presentation of a greater area to the inflowing air than would be presented in the absence of the bulging, thereby retarding surface clogging and increasing the capacity and efficiency of the filtering element.

Figure 5:
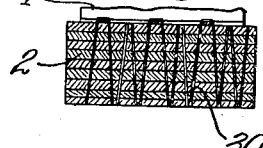
Fig. 5 is a transverse sectional view through a modified filter element.

An alternative method of securing the filtering body to the support is illustrated in Fig. 5. In this modification, the body 2 is stitched to support 1 by means of threads 30 which pass over the solid portions of the support. If desired, the filtering body may be glued to the support. It is preferable to stitch or glue the filtering body to the support at a single point in the circumference of the latter only inasmuch as the desired uniform compression of the body and bulging of the middle portions, as above described, is not substantially hampered in this way. It is sometimes necessary, however, to fasten the filtering material to the support at several points to prevent sagging of portions too far removed from the fastening point.

Since the filtering body of this invention is formed from ribbons of elastic material wound under tension, it is compact and tends to hold itself together and to the support upon which it is wound. A high degree of uniformity is obtainable which is maintained throughout the life of the element although it is subjected to considerable vibration or jolting. Many other advantages of this filter will be apparent to those skilled in the art.

I claim:

1. A gas-filtering element consisting of a cylindrical support of apertured sheet material and a filtering body comprising a thickness of spirally wound substantially continuous expanded sheet material surrounding said support, the outer layers of said filtering body being expanded to a greater degree than the inner layers thereof.

2. A gas-filtering element comprising a cylindrical support of apertured sheet material, a filtering body comprising a thickness of spirally wound substantially continuous expanded sheet material surrounding said support, and a staple passing through said support and said filtering body to fasten them together.

3. A gas-filtering element comprising a cylindrical support of apertured sheet metal, a filtering body comprising a thickness of spirally wound substantially continuous expanded sheet material surrounding said support, and a wire staple passing through said support and said filtering body and clinched over the latter to fasten said body to said support, said staple being welded to said support.

4. In a gas filter having a base with a seat adapted to receive a cylindrical filtering element, a filtering element seated on said base and consisting of a cylindrical support of apertured rigid sheet material and a filtering body of greater width than said support comprising a thickness of spirally wound substantially continuous expanded sheet material surrounding said support, a cover member, and means for urging said cover member toward said base, the construction and arrangement being such that said filtering body is axially compressed and bulged outwardly when said cover member is drawn to engagement with said support.

5. The herein described method of manufacturing a cylindrical gas-filtering element including a filtering body of expanded fibrous sheet material spirally wound around an apertured support, which consists in winding a ribbon of expanded fibrous sheet material onto said support and simultaneously maintaining a progressively increasing tension in said ribbon as said ribbon is being wound upon said support, thus producing a filtering body having a progressively finer mesh in the direction of flow of air through said body.

BRUCE G. HEEBINK.